(12) United States Patent
Benveniste

(10) Patent No.: US 6,990,348 B1
(45) Date of Patent: Jan. 24, 2006

(54) SELF-CONFIGURING WIRELESS SYSTEM AND A METHOD TO DERIVE RE-USE CRITERIA AND NEIGHBORING LISTS THEREFOR

(75) Inventor: Mathilde Benveniste, South Orange, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/565,537

(22) Filed: May 5, 2000

Related U.S. Application Data

(60) Provisional application No. 60/133,096, filed on May 7, 1999.

(51) Int. Cl.
*H04Q 7/20* (2006.01)

(52) U.S. Cl. .................... 455/447; 455/429; 455/446

(58) Field of Classification Search .............. 455/447, 455/446, 429, 427, 453
See application file for complete search history.

(56) References Cited

U.S. PATENT DOCUMENTS 6,729,929 B1 * 5/2004 Sayers et al. ............... 455/446

* cited by examiner

*Primary Examiner*—Tilahun Gesesse
(74) *Attorney, Agent, or Firm*—Michael Haynes PLC

(57) ABSTRACT

A self-configuring wireless system and a method are disclosed. The method derives re-use criteria and neighbor lists to enable the assignment of channels to cells in a wireless communications system, based entirely on measurements made by the system during normal operation. The disclosed method can be implemented with conventional cellular equipment and functionality provided by current air interface standards, and requires no human participation. The disclosed method also applies to the derivation of neighbor lists.

8 Claims, 2 Drawing Sheets

Figure 1. Coordination of signal-strength measurements

SELF-CONFIGURING WIRELESS SYSTEM AND A METHOD TO DERIVE RE-USE CRITERIA AND NEIGHBORING LISTS THEREFOR

Benefit is hereby claimed under 37 CFR 1.78(4) to copending U.S. Provisional Application Ser. No. 60/133,096, filed May 7, 1999, entitled "Method for Determining Frequency/Channel Re-use Criteria for a Cellular Wireless Communication System," by Mathilde Benveniste.

BACKGROUND OF THE INVENTION

1. Field of the Invention

This invention relates to wireless systems and more particularly relates to self-configuring wireless systems.

2. Related Art

This application is related to U.S. Pat. No. 5,404,574 to Mathilde Benveniste, entitled "Apparatus And Method For Non-Regular Channel Assignment In Wireless Communication Networks", assigned to AT&T Corporation and incorporated herein by reference.

This application is also related to U.S. Pat. No. 5,787,352 to Mathilde Benveniste, entitled "System And Method For Management Of Neighbor-Channel Interference With Power Control And Directed Channel Assignment", assigned to AT&T Corporation and incorporated herein by reference.

Growing demand for wireless voice and data communications will soon lead to a complex mixture of cells, found in unpredictable signal propagation environments. Easy installation and readiness for operation are features that appeal to an owner/operator of a wireless communication system based on a channelized air interface. Examples of such air interfaces include the Advanced Mobile Phone Service (AMPS), the Interim Standard 136 (IS-136), the Global System for Mobile Communications (GSM), and the EDGE interface. Radio frequency (RF) planning for such systems is difficult and expensive to do manually and is becoming a more substantial portion of wireless communication costs as the cost for base stations decreases. Ideally, one would want wireless systems that can self configure. Once the base stations are in place, the system would have the ability and intelligence to perform all RF-planning tasks autonomously.

The ultimate goal of self-configuration is to delegate all RF planning tasks, presently performed manually by expert staff, to software residing within the wireless system. In addition, a wireless system should be self-healing, and it should scale up easily without the need for major service disruption and complete re-planning. Finally, in addition to totally automating RF planning, self-configuration should also put in the hands of the owner of a wireless system—however large or small—optimal algorithms for every aspect of RF planning. For all this to be achieved, a self-configurable system must be able to extract, from data it collects itself, the necessary information to support its software intelligence.

The key RF-planning tasks facing operators of wireless channelized systems are the following: the construction of neighbor lists, power planning, and re-use planning. The neighbor list facilitates hand-over to neighbor cells of calls made by moving subscribers. Power planning addresses two problems: setting the transmit-power levels on the control channel and on the traffic channels. The relative power transmitted on the various base stations' control channels determines cell coverage. Traffic power control is intimately linked to traffic channel assignment as the transmitted power determines interference.

Re-use planning, the system-planning task that has received most attention in the literature, addresses three distinct problems. One is the assignment of frequencies/time slots to the control channels of base stations. Another re-use planning task is traffic-channel assignment, which assigns frequencies/time slots to voice calls or packets as they occur. The third re-use planning task, which arises only in hierarchical configurations, deals with the sharing of the same RF spectrum by two wireless systems. [1] Supporting re-use planning, are the channel 're-use criteria' which have traditionally taken the form of 'interferer lists', comprising the cells capable of causing interference if assigned the same channel. An interferer list is similar to a neighbor list, except that it involves different threshold values. The same method thus applies to the derivation of both.

A problem confronting the prior art is how to derive re-use criteria to assign channels to cells in a wireless communications system, based entirely on measurements made by the system during normal operation, thus enabling self-configuration.

SUMMARY OF THE INVENTION

The invention disclosed herein is a self-configuring wireless system and a method to automatically assign channels by deriving re-use criteria and neighbor lists for the system. The invention enables the assignment of channels to cells in a wireless communications system, based entirely on measurements made by the system during normal operation. One aspect of the method of the invention includes the steps of: conducting normal traffic transmissions between base stations and mobile stations in each cell; isolating individual signals from base stations by time-sharing a calibration frequency assigned for use by consecutive cells during a scheduled interval when a cell is not conducting normal traffic transmissions; measuring a signal strength of the calibration frequency received at mobile stations within a cell and mobile stations nearby the cell from a base station within the cell during the scheduled interval and determining signal-to-interference ratios between the base station and the mobile stations as a communication quality metric; and selectively reassigning channels to the base station based on the communication quality metric. The disclosed method can be implemented with conventional cellular equipment and functionality provided by current air interface standards, and requires no human participation. The disclosed method also applies to the derivation of neighbor lists.

DESCRIPTION OF THE PREFERRED EMBODIMENT

Figure 1:
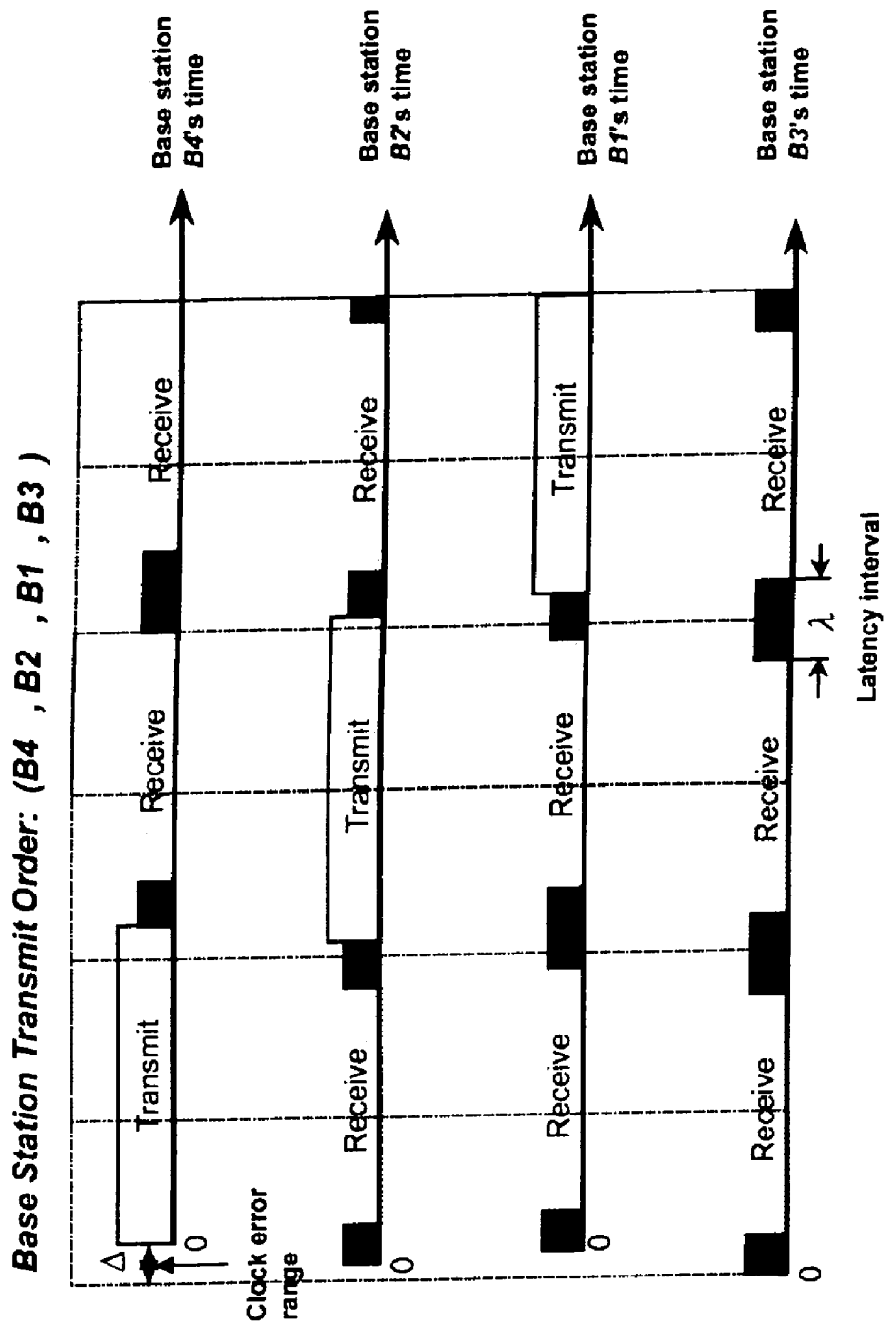
FIG. 1 is a diagram of coordination strength measurements.

The invention addresses the problem of constructing interferer, and by extension neighbor, lists based on measurements collected by the system. We start with a discussion of channel assignment and describe the statistical hypothesis tests employed to derive re-use criteria. After describing the data used to test the hypothesis and how it is collected, we present the statistical test design. The methodology presented herein is discussed in the context of circuit-switched voice calls. The same methodology applies to packet-based access for data.

"Channel Assignment"

Channel assignment associates RF frequencies or time slots with users, for a given time-interval, in a way that maintains the specified communication quality. We refer to a group of cells assigned the same frequency as a co-channel group. The problem addressed by channel assignment is, first, to identify the composition of various co-channel groups and, second, to assign frequencies to these groups. Two distinct channel assignment problems arise in a typical wireless system handling voice traffic: the assignment of frequencies or time-slots to control channels and the assignment of frequencies or time-slots to traffic channels.

"Control-Channel Assignment"

Control channels enable cell selection, call setup and call hand-over or random access and reservation and, as such, must be available constantly. This suggests that a fixed channel assignment must be used for control channels. In an overlay configuration, where the adjunct system must coordinate its channel use with that of the primary system, control-channel assignments may require replacement in response to changes in the usage of the RF spectrum by the primary system. Even if it is not possible to keep adjunct control channel assignments fixed indefinitely, it is desirable to do so for as long as primary system channel use remains constant; that is, adjunct control-channel assignments must be static [1].

Several algorithms exist for fixed channel assignment. Traditionally, channel re-use followed tessellating patterns of distinct channel sets on regular grids of cells. [2] [3] Such channel assignment methods, referred to as 'regular' channel assignment, is optimal for uniform traffic distribution across the cells. Non-regular channel assignment methods are preferable if base stations are not located on a regular grid or if the traffic distribution is not uniform. [4]–[7] Self-configuring wireless systems can employ only non-regular channel assignment methods because the placement of base stations, which is not restricted in any way, is unlikely to give rise to a regular grid.

Non-regular channel assignment methods produce channel assignments that optimize a specified objective while respecting constraints that include communication quality constraints; the latter are typically reducible to a minimum signal-to-interference (S/I) ratio requirement. The constrained optimization problem addressed in non-regular channel assignment is amenable to solution by discrete optimization and mathematical programming techniques.

Pennotti [4] presents the first application of graph-coloring to cellular RF planning. His formulation seeks the minimum RF spectrum (total number of channels serving a cellular system) that can meet cell-specific requirements for assigned channels, subject to pair-wise re-use restrictions that are inferred from S/I ratio requirements.

Benveniste in U.S. Pat. No. 5,404,574, incorporated herein by reference, [5]–[7] introduces the use of generalized linear programming to wireless RF planning. A converging, optimal, iterative column-generation scheme is presented to solve the mixed-integer convex mathematical program that arises when seeking channel assignments that maximize the traffic-carrying capacity of a given RF spectrum allotment, subject to stochastic S/I ratio constraints. Column vectors (which are equivalent to maximal independent sets when the problem is posed as a graph theoretic problem) comprising co-channel groups of cells that satisfy the communication quality constraint, are generated in each iteration of the algorithm until the optimality condition is met. The master program computes dual multipliers that are employed in the generation of the column vectors. This algorithm is employed not only in fixed channel assignment but also in adaptive channel assignment and adaptive-dynamic channel assignment, as discussed herein.

"Traffic-Channel Assignment"

The second type of channel assignment deals with frequencies that carry call traffic exclusively. We exclude from our discussion frequencies that carry both traffic and control channels. This possibility arises in asynchronous FDMA/TDMA systems where traffic channels are bundled on the same frequency as the control channel. Since the time slots borne on the same frequency must be assigned to the same cell, the assignment of the traffic channels associated with a control channel must remain fixed.

The techniques applicable to traffic-channel assignment are more diverse (Reference [9] reviews several channel assignment algorithms.) The following classification of channel assignment techniques has been proposed by Benveniste in U.S. Pat. No. 5,809,423, which is incorporated herein by reference. [8] (The terminology used in the classification of channel assignment algorithms may have been used differently by other investigators.) Channel assignment approaches are classified into two broad categories: fixed and flexible. As explained above, fixed channel assignment comprises regular and non-regular channel assignment methods. Flexible channel assignment comprises three sub-categories: adaptive, dynamic, and adaptive-dynamic (the latter being a hybrid of the two).

Fixed channel assignment fixes the relationship of channels to cells. Only the channels allocated to a cell can be assigned to calls in that cell. Moreover, a channel allocated to a cell by a fixed channel assignment method will enjoy adequate quality if assigned to call in that cell since the allocation is designed to respect the re-use criteria. Optimal non-regular channel assignment methods lead to the efficient utilization of the RF spectrum because they can generate compact re-use (minimum re-use distances). [5]–[7]

Flexible channel assignment methods exploit the capability for real-time remote retuning of the base-station transceiver frequencies. One of the types of flexible channel assignment, adaptive channel assignment, is a time-varying non-regular channel assignment that adjusts the allocation of channels to cells over time by adapting to trend (longer-term) changes in traffic load. [6]–[8] As in fixed channel assignment, the relationship of channels to cells is fixed for a period of time and, because the allocation respects re-use criteria, assignment of an allocated channel to a call will lead to adequate communication quality. The utilization efficiency of the RF spectrum attainable with optimal non-regular channel assignment methods is preserved by adaptive channel assignment while benefiting at the same time from the ability to adapt to traffic trend variations.

Dynamic channel assignment dispenses with the fixed relationship of channels to cells. More cells are allowed to use a channel than would be possible to sustain the desired communication quality with simultaneous use of the channel. Hence, in contrast to previously discussed methods, the communication quality that would result from the assignment of a channel to a call must be checked before actual channel assignment. This check may either involve compliance with established re-use criteria, or it may be based on real-time measurement of interference. [10]–[13] The flexibility of a cell to select from a larger pool of channels both enables dynamic channel assignment to adapt both to long-term variations in traffic and to short-term variations due to the random nature of traffic. But, as it has been shown, dynamic channel assignment may perform worse than fixed channel assignment in congestion. [14] The reason for the inferior performance is that frequency re-use without coordination among cells results in a longer average re-use distance; hence, lower RF spectrum utilization efficiency.

Adaptive-dynamic channel assignment is a dynamic channel assignment approach that assigns priority to a subset of the channels accessible to a cell. The channels with high priority are determined as in adaptive channel assignment, by optimal non-regular channel assignment methods. This approach benefits from the advantages of both adaptive and dynamic channel assignment as it yields tighter and more efficient re-use in congestion, while enjoying better performance with lighter traffic loads resulting from the greater flexibility afforded in channel selection. For details on the possible variations of adaptive-dynamic channel assignment methods, the reader is directed to reference [8].

As seen above, many of the methods for traffic-channel assignment utilize re-use criteria, whether they employ non-regular channel assignment algorithms or not. In a self-configuring wireless system where the location of base stations is arbitrary and unknown to the system, re-use criteria are derived from signal-strength measurements.

"Re-Use Criteria"

Re-use criteria must address the likelihood of meeting a specified communication quality target when all the cells in the re-use group transmit on the same channel simultaneously. Re-use criteria have been derived traditionally by an array of methods that involve manual measurements to calibrate empirical models utilizing knowledge of terrain characteristics and the physical location of the base stations. Traditional re-use criteria derivation, which must be performed both upon installation of the system and upon its expansion, is labor-intensive and costly. A self-configurable system simplifies the process by deriving re-use criteria autonomously from signal strength measurements that are collected by the system. The measurements capture all random effects such as the variation in signal strength due to propagation path loss, shadow fading, and any power control applied.

In deriving re-use criteria, only nearby cells need be considered, of which there are typically several. For simplicity, re-use criteria have been approximated with pair-wise permissions, which take the form of interferer lists. (The subject of traffic channel assignment, often linked with power control, has received substantial attention in the literature where a variety of algorithms have been proposed. It will not be covered herein except in relation to implementation requirements imposed on self-configuration. For examples of different techniques see Benveniste, U.S. Pat. No. 5,787,352, incorporated herein by reference, and see references [10] and [15] through [19]). Two cells belong on each other's interferer list if the required communication quality target cannot be met with a specified probability. Hence, permission to use a given channel is denied to a cell if any of the cells on its interferer list is assigned that channel.

The metric of communication quality employed in the derivation of re-use criteria is expressed in terms of the signal-to-interference (S/I) ratio, or the bit-error rate [which can be reduced to an equivalent S/I ratio]. Signal-strength measurements between mobiles and base stations are needed for this metric, whose collection requires the assignment of control channels to enable mobiles to register and receive instructions from the base stations. Hence, an initialization phase is inserted that assigns preliminary control channels for this purpose.

"Initialization Phase"

During the initialization phase, each cell is assigned a control channel and, optionally, at least one traffic channel. Both are used during the operation phase (also referred to as the 'learning' phase) to enable mobile registration. If there are enough RF frequencies available to provide the necessary channels without the need for re-use, the derivation of re-use criteria can be by-passed in this phase. Otherwise preliminary re-use criteria must be derived. The initialization phase can be by-passed when expanding a wireless system if there exist sufficient RF frequencies to assign as control channels to the newly added base stations without causing interference to, or experiencing interference from, existing base stations.

Re-use criteria in the initialization phase are derived from signal strength measurements between base stations. Base-to-base signal strength measurements can be made if base stations are capable of receiving signals in both the up-link and the down-link RF bands. Alternatively, a radio(s) tunable to down-link frequencies can be placed at each base for this purpose. The received signal strength is the criterion for re-use. If a base station's signal, as measured by another base station, exceeds a specified threshold level, the two cells may not use the same channel. The measured signal strength is ascribed to a unique base station if measurements are coordinated by the procedure described herein.

Re-use criteria so derived are only rough estimates of the re-use criteria, to be used for the preliminary assignment of control channels, which will enable mobile registration in the learning phase. Though generally reliable, they can be improved. The paths traversed by communication signals between the base station and various mobile locations differ from those of base-to-base signals. Hence, base-to-base signal-strength measurements cannot represent communication quality as well as base-to-mobile measurements. For instance, if the direct path between two base stations is blocked by an obstruction—like a wall—base-to-base measurements may falsely suggest that re-use is possible.

"Learning Phase"

With control channels assigned to each cell upon completion of the initialization phase, mobile registration and call setup are now possible. This enables the collection of signal measurements between mobiles and base stations, which is needed to perform autonomously all of the RF planning functions, including the accurate derivation of re-use criteria. Hence, the name "learning" phase. The learning phase goes on indefinitely and encompasses normal operation. In its early part, referred to as "operator-assisted learning", operator-carried mobiles are moved around the wireless system service area to help collect base-to-mobile measurements.

Base-to-mobile signal strength measurements can be made either by the base station or by the mobiles [under the direction of the base station], depending on the air interface standard employed. In a TDMA (IS 136 or GSM) system, such measurements can be collected by the mobile through the MAHO (Mobile-assisted hand-over) and MACA (mobile-assisted channel assignment) functions.

For both functions, the serving base station requests its registered mobiles to measure the signal on the control channels assigned to base stations of interest. In AMPS systems, base-to-mobile measurements can be collected on the uplink. The serving base stations can measure the serving signal strength for all active mobiles, while "locate" radios, placed at each base station, can measure the signal strength from designated active mobiles in other cells. Locate' radios are analog radios, placed at the base station, capable of measuring the signal strength from designated mobiles in other cells, in order to facilitate call hand-off in AMPS systems. (Pair-wise permissions have traditionally been relied on by most of the existing channel assignment algorithms in order to establish the admissibility of channel assignments. Ideally, one would want to consider channel use in all cells surrounding a given cell at once when the admissibility of a channel assignment is assessed. Because pair-wise permissions are derived without accounting for channel use by cells other than the pair considered, assumptions must be made about the interference contributed by use of the channel elsewhere. Such assumptions, which account for the worst-case scenario, are more restrictive than necessary and, consequently, lead to more conservative channel assignments as certain feasible combinations of co-channel assignments are excluded.)

The re-use criterion in the learning phase is whether an adequate S/I ratio will be experienced on both communications directions with a specified probability. Given base-to-mobile measurements, one can calculate the observed S/I (signal-to-interference) ratio, and thus use it as the communication quality metric in the learning phase.

"Communication Directions"

A channel is deemed usable if channel quality is satisfactory on both communication directions; that is both on the down-link (as experienced by the mobile) and on the up-link (as experienced by the base station). This does not imply, however, that measurements must be made on both directions. Measurements taken on one direction can be used to obtain the data needed for determining the S/I ratio on both directions. Knowledge of the power control policy, if one is employed, is required for this purpose.

Moreover, under certain power control policies, known as complementary policies, it is sufficient to test only one communication direction. [19] A useful duality relationship associated with such power control policies makes the S/I ratio experienced by one member of a pair of users along one communication direction equal to the S/I ratio experienced on the other direction by the other member of the pair. Consequently, if an S/I ratio requirement is met on the down-link by both users, the same requirement will be met on the up-link, under complementary power control policies.

"Signal Isolation"

To be useful, base-to-mobile measurements must be attributable to a unique source; hence, they may not be contaminated with interference. If control channels are not re-used, interfering signals can be easily attributed to the source assigned the measured channel. But when there is re-use, interfering signals represent the superposition of signals from several sources that may be comparable in strength. Hence, a signal cannot be traced to a single source, unless it is isolated. Isolation of interfering signals is possible by the measurement coordination procedure described herein.

"Coordination of Measurements"

The derivation of re-use criteria is based on point-to-point signal-strength measurements either between pairs of base stations (during initialization) or between mobile locations and nearby base stations (during learning). To be useful, the signal-strength measurements must be attributable to a unique source. When there is re-use, a measured signal is typically the superposition of signals from several sources, with no way of identifying the magnitudes of the individual component signals.

Isolation of individual signals is achieved by the time-sharing scheme illustrated in FIG. 1. One or more known frequencies, identified as the calibration frequency(ies), is assigned for use by each cell according to a pre-specified schedule. During learning, the calibration frequency is rotated among the cells. Cells use their assigned frequencies all the time, except during their scheduled transmit interval when they switch to the calibration frequency. In a TDMA system, where base-to-mobile measurements are made by the mobiles, the calibration frequency is a down-link control or traffic channel. Regular signal-strength measurements are made on the calibration frequency by the mobiles. In an AMPS system, where base-to-mobile measurements are made by the base stations, the calibration frequency is an up-link traffic channel. Active mobiles are assigned the calibration frequency during their cell's scheduled transmit interval, while base stations make regular measurements on that frequency.

The same time-sharing scheme is used during system initialization. Each base station transmits a known strength signal on the calibration frequency for its scheduled transmit interval and listens to that frequency the rest of the time. Measurements made during a given transmit interval can thus be uniquely attributed to a cell. The transmit-receive cycle is repeated until enough measurements have been collected. Several calibration frequencies would be used to collect data faster.

It is important to note that the proposed time-sharing scheme, if used as described, may suffer from measurement ambiguity when the base station clocks are not perfectly synchronized. As illustrated in FIG. 1, two cells' transmit cycles may overlap; there may be no transmission for a given time interval; or, finally, a measurement may be attributed to the wrong cell. These ambiguities may arise both during initialization and learning.

The problem associated with imperfect synchronization is avoided by disregarding the signal during a portion at both ends of a transmit interval, the latency interval. In the initialization phase, base stations turn their receivers off during the latency interval. In the learning phase, mobiles (in the case of FDMA/TDMA systems) or base stations (in the case of AMPS systems) refrain from making measurements during the latency interval. It can be shown easily that, if the latency interval is greater than or equal to twice the maximum discrepancy that can be observed between two base stations' clock times, no ambiguities will arise.

"Hypothesis Test"

The derivation of re-use criteria can be viewed as testing the statistical hypothesis that p, the probability of meeting the communication quality target in a cell within a co-channel group, is greater than or equal to a desired level $p_0$. If the hypothesis is rejected for some cell in the group, co-channel use by the group is not admissible. In the learning phase, the re-use criterion is met when the S/I ratio target is met. In the initialization phase, base-to-base signal-strength measurement between a pair of base stations must fall below a specified threshold level for re-use to be permitted.

If we consider, for example, the learning phase and assume that the system collects down-link signal-strength measurements, a sample point, referred to as a mobile location k, is defined by the following measurements:

$S_j^{(k)}$ the serving signal strength at mobile location k in cell j $I_{ij}^{(k)}$ the interfering signal strength from base station i received at mobile location k in cell j.

The random variable employed in the re-use criterion is the S/I ratio associated with each sample point. We write the expression for the re-use criterion in terms of the above measurements after first introducing the following notation:

T the target level for the signal-to-interference ratio p the desired coverage probability $C_1$ the set of cells in co-channel group The S/I ratio requirement in each cell j in the co-channel group $C_1$ is described by the following probability statement:

$$Prob\left[\frac{S_j}{\sum_{i \neq j \in C_1} I_{ij}} \geq T\right] \geq p \text{ for } j \varepsilon C_1$$

For each mobile location in the sample from cell j, the interference contributed by all other cells in the candidate co-channel group $C_1$ is summed, and the ratio of the serving signal strength to the total interference is compared to T.

The above hypothesis is equivalent to testing the hypothesis that the success probability p of a Bernoulli experiment is greater than or equal to $p_0$, where the Bernoulli variable X assumes the value of 1 when the specified re-use criterion is met; and 0 otherwise. Aside from the difference in the criteria used to define the Bernoulli variables in the two phases (that is whether the probability statement involves the measured signal strength or the signal-to-noise ratio) the hypothesis tests employed in the two phases are identical. Hence, the test design is presented herein only for the learning phase. (A Bernoulli experiment is an experiment designed to yield either a "yes" or a "no" answer.)

"Hypothesis Test Design"

The statistical data used to test the hypothesis in the learning phase is a function of the signal strength measurements collected by the system. Let $Z_{1j}$ be the number of mobile locations in cell j with S/I ratio above T When re-use criteria take the form of interfere lists, the set $C_1$ consists of a pair of cells. In that case, it is helpful to think of the first subscript of Z as the 'other' cell in the pair. In the remainder of this section we drop the subscripts for simplicity of presentation.

To test the requirement in (1), we count the number, Z, of mobile locations in the random sample from cell j experiencing an S/I ratio above the threshold T. If the re-usability hypothesis posited above is true, one would expect Z to be large. Hence the hypothesis test is the following:

Hypothesis Test: Reject the hypothesis if Z<n $p_0$+t, where t is a constant. The value of t is determined by analyzing the error probability as described herein.

"Adaptive Hypothesis Test"

In addition to deriving initial re-use criteria, a self-configuring wireless system tracks possible changes in the RF propagation environment, and modifies the re-use criteria accordingly. Changes are tracked by updating the test statistics to reflect the most recent data. Only the last n measurements need be retained in memory. The statistic Z is evaluated as follows. If $X^{(k)}$ is the Bernoulli variable associated with the most recent mobile location reporting measurements, the current estimate of the statistic $Z^{(k)}$ is constructed from the previous estimate as follows:

$$Z^{(k)} = X^{(k)} + Z^{(k-1)} - X^{(k-n)}$$

Figure 2:
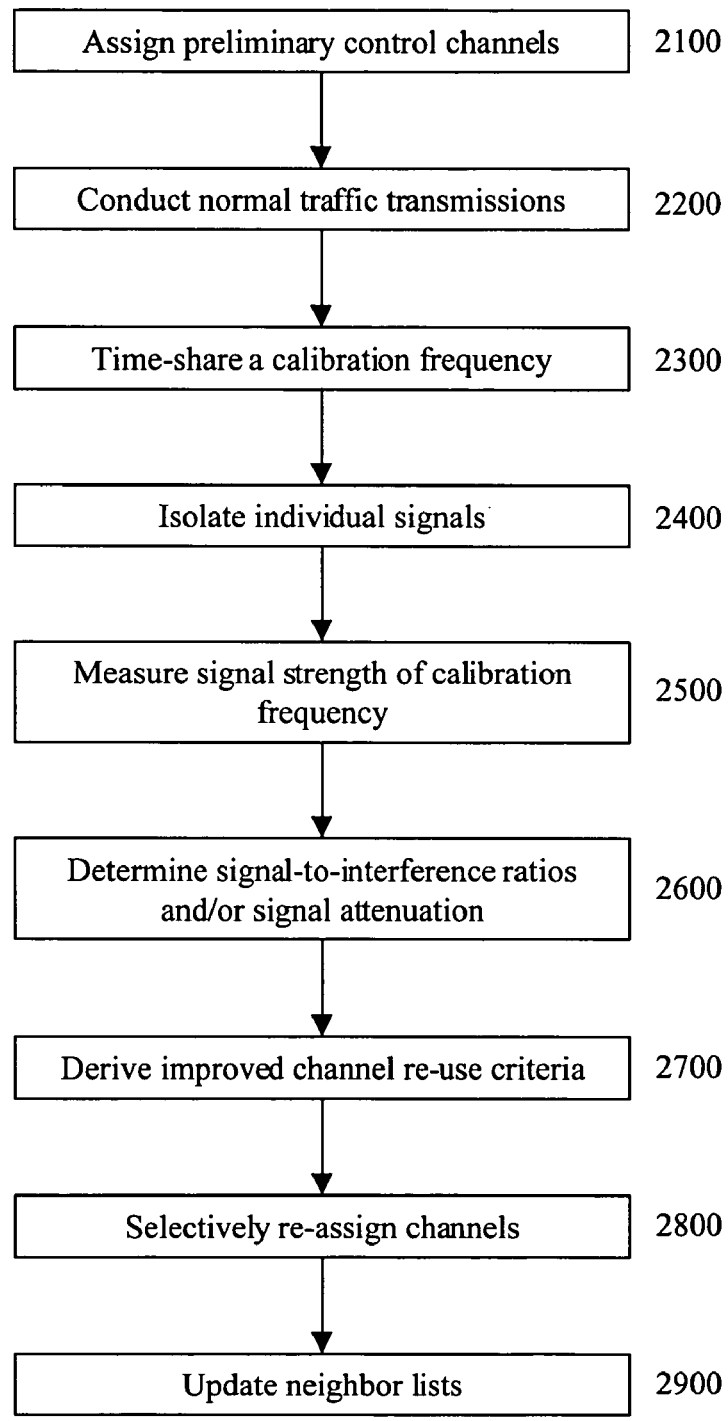
FIG. 2 is a flowchart of an exemplary method 2000.

FIG. 2 is a flowchart of an exemplary method 2000 for self-configuring a wireless system during normal operation, said system including a plurality of cells, each cell including a respective base station and at least one mobile station. Step 2100 involves assigning preliminary control channels to base stations in a plurality of cells during an initialization phase. Step 2200 involves conducting normal traffic transmissions between base stations and mobile stations in each cell. Step 2300 involves time-sharing a calibration frequency assigned for use by consecutive cells during a scheduled interval. Step 2400 involves isolating individual signals from base stations Step 2500 involves measuring a signal strength of the calibration frequency received at mobile stations within a cell and mobile stations nearby the cell from a base station within the cell during the scheduled interval. Step 2600 involves determining signal-to-interference ratios between the base station and the mobile stations as a communication quality metric and/or determining signal attenuation between the base stations on which channel re-use criteria are derived. Step 2700 involves deriving improved channel re-use criteria from said signal-to-interference ratios. Step 2800 involves selectively reassigning channels to the base station based on said improved re-use criteria. Step 2900 involves automatically updating neighbor lists in response to said reassigning channels.

The number of measurements that must be retained in memory equals the required sample size. Memory-less methods (that is, methods that don't require remembering any of the past measurements) offer no advantage in a self-configurable wireless system because the same data must be retained for other reasons.

"Error Probability Analysis"

The constant t and the required sample size n are chosen so that they limit the error probability as follows. The error that arises from the false rejection of the hypothesis is required to be no more than α. The error that arises from the false acceptance of the hypothesis is required to have size β when the true value of p is less than or equal to $p_1 < p_0$. Hence, we have the following requirements:

$$Prob[Z<n\ p_0+t|p=p_0] \leq \alpha$$

$$Prob[Z \geq n\ p_0+t|p=p_1] \leq \beta$$

For α and β less than 0.5, t will be negative.

If the spacing between consecutive measurements is sufficiently long to ensure their independence, Z, representing the sum of independent identically-distributed Bernoulli variables, has a binomial distribution with parameters p and n. That is, $$Prob[Z \leq u] = \sum_{x=0}^{u} \binom{n}{u} p^u (1-p)^{n-u}$$

where u is an integer, $0 \leq u \leq n$, and $$\binom{n}{u}$$

is the binomial coefficient. The inequalities in (2) and (3) can be solved for n and t by a nested iterative search.

"Nested Search"

The solution of the system of inequalities in (2) and (3) is obtained by an iterative search over n, nested within a search over t. We seek the smallest n value for which there exists a t satisfying inequalities (2) and (3)—or, equivalently, we seek the smallest 'feasible' n value. The following observations are useful in the search for a feasible t value, given n.

1. The left-hand side in (2) decreases for decreasing t values.

2. The left-hand side in (3) decreases for increasing t values.

3. Hence, if the current value $t_0$ satisfies inequality (2) but not (3), then a feasible t value cannot be less than $t_0$.

4. If the current value $t_0$ satisfies inequality (3) but not (2), then a feasible t value cannot be greater than $t_0$.

5. If there is a value of t such that neither inequality (2) or (3) is satisfied when $n=n_N$, then $n_N$ is in-feasible.

The efficiency of a search depends on the choice of starting points. Good starting points are derived from the closed-form solution obtained when the system of inequalities in (2) and (3) is solved using the limiting distribution of Z.

"Limiting Distribution of Z"

By the De Moivre-Laplace Limit Theorem, the limiting distribution of Z is normal with the following mean and variance:

$$E(Z) = n\,p$$

$$Var(Z) = n\,p(1-p)$$

Hence, the requirements in (2) and (3) can be written as the inequalities (7) and (8), respectively.

$$\frac{n\,p_0 + t - E(Z \mid p_0)}{\sqrt{Var(Z \mid p_0)}} \leq z_\alpha$$

$$\frac{n\,p_0 + t - E(Z \mid p_1)}{\sqrt{Var(Z \mid p_1)}} \leq z_\beta$$

where $z_\alpha$ the $\alpha^{th}$ quantile of a standard normal variable. Replacing the expected value and variance of Z by the expressions given in (5) and (6), respectively, we have $$z_{1-\beta}\sqrt{n\,p_1(1-p_1)} - n(p_0 - p_1) \leq t \leq z_\alpha \sqrt{n\,p_0(1-p_0)}$$

The condition in (9) provides a range for t, given n. Solving for n, we get $$n \geq \left[\frac{z_{1-\beta}\sqrt{p_1(1-p_1)} - z_\alpha \sqrt{p_0(1-p_0)}}{p_0 - p_1}\right]^2$$

The limiting distribution is only an approximation to the true distribution. Hence, the expression in (10) gives only a starting value for the search over n. If a feasible t cannot be found, higher values of n are considered.

The limiting distribution underestimates the left-hand side of inequality (2), and overestimates the left-hand side of inequality (3), for the error probabilities of interest. Hence, the range given by the inequalities in (9) satisfies inequality (3), but not necessarily inequality (2). To find a t value that satisfies both inequalities, we start with the smallest value of t in this range yielding an integer value for n $p_0$+t. If inequality (3) is met, a feasible t value has been found and the specified n value is feasible. Otherwise, we decrease t. Both inequalities, (2) and (3), must be checked in the search. If a t value is encountered that satisfies neither inequality, then the specified n value is in-feasible, as stated by observation 5.

"Numerical Example"

We want to check whether a pair of cells are not mutual interferers. By our analysis, this is equivalent to saying that the probability with which the S/I ratio in each of the two cells will exceed the desired level is at least $p_0=0.90$ when the same channel is used in both cells. The test design requirements are the following. The probability of falsely rejecting the hypothesis must not be greater than $\alpha=0.05$. And, if the hypothesis is wrong and the true p value is only $p_1=0.75$, we wish to keep the probability of falsely accepting the hypothesis at or below $\beta=0.05$.

The search is started by using the relationships in (10) to get the starting value of 65 for the sample size n. For that n value, (9) gives a lower bound for t equal to −4.0. Feasibility of the inequality in (2) is checked by evaluating the binomial distribution in (4), for u=int(n $p_0$+t+0.5)=54. The resulting error probability is 0.057; thus we conclude that the requirement in (2) is not met. Since this value of t is not feasible, we consider lower values next, but find that there is no feasible t value for n=65. Higher values of n are thus considered. Our search shows that the smallest feasible value of n is 69, with a corresponding feasible t value of −4.4.

The above-computed parameters, n=69 and t=−4.4, define the test needed to establish re-use for a pair of cells. For each cell in the pair, the S/I ratio experienced when the other cell uses the same channel will be measured at 69 different mobile locations, and the number, Z, of mobile locations meeting the desired S/I target will be counted. If $$Z < n\,p_0 + t = 69\,(0.90) - 4.4 = 57.7$$

for either cell, the hypothesis is rejected, and the conclusion is that the cells belong on each other's interferer list. The hypothesis must be accepted on both communication directions in order to permit the proposed channel assignment, unless complementary control policies are employed.

"Conclusions"

Supporting channel assignment techniques in a wireless communications system are RF re-use criteria, whose derivation in the past has involved a tedious and complex process. We have addressed herein the problem of deriving re-use criteria based entirely on measurements made by the system during normal operation, thus enabling self-configuration. A procedure is presented for collecting such measurements that can be implemented with conventional cellular equipment and functionality provided by the current air interface standards; it requires no human participation. A statistical hypothesis test was designed to allow channel re-use only in situations where adequate coverage can be furnished with a specified confidence level. The procedure described herein applies to the derivation of neighbor lists as well.

Various illustrative examples of the invention have been described in detail. In addition, however, many modifications and changes can be made to these examples without departing from the nature and spirit of the invention.

REFERENCES

1. M. Benveniste, "Self-configurable wireless systems: Spectrum monitoring in a layered configuration," in *Proc. Globecom* 2000, Rio de Janeiro, Brazil, December 1999.
2. V. H. MacDonald, "Advanced mobile phone service: the cellular concept," *Bell System Technical Journal* 58 (1979) 15–41.
3. S. W. Halpern, "Re-use partitioning in cellular systems," in *Proceedings of the 33rd Vehicular Technology Conference* (1983) 322–327.
4. R. J. Pennotti, *Channel Assignment in Cellular Mobile Telecommunication Systems*, Ph.D. Dissertation, Polytechnic Institute of New York, June 1976.
5. M. Benveniste, "Apparatus and Method for Non-Regular Channel Assignment in Wireless Communication Networks," U.S. Pat. No. 5,404,574, May 1992.
6. M. Benveniste, "An Optimization Model for Non-Regular Channel Assignment in Wireless Communications Networks", *Proc. AT&T Networks and Systems Performance Symposium*, Holmdel, N.J., Sep. 28–29, 1993.
7. M. Benveniste, "Solution of the Non-regular Channel Assignment Problem in Wireless Communications Systems through Generalized Linear Programming", EURO INFORMS XXXIV Joint International Conference in Barcelona, Spain, July 1997.
8. M. Benveniste, "Adaptive-Dynamic Channel Assignment Organization System and Method", U.S. Pat. No. 5,809, 423, March 1995.
9. I. Katzela and M. Naghshineh, "Channel assignment schemes for cellular mobile telecommunication systems: A comprehensive survey," *IEEE Personal Communications* (1996).
10. Z. J. Haas, J. H. Winters, and D. S. Johnson, "Simulation results of the capacity of cellular systems," IEEE Transactions on Vehicular Technology 46 (1997) 805–817.
11. L. J. Cimini, Jr., G. J. Foschini, and C.-L. I, "Call Blocking Performance of Distributed Algorithms for Dynamic Channel Allocation in Microcells", *IEEE Trans on Communications*, August 1994, p 2600.
12. R. Nettleton and G. R. Schloemer, "A high capacity assignment method for cellular mobile systems", in \f2Proc. Vehicular Technology Conference '89\f1, May 1989, 359–367.
13. J. F. Whitehead, "Performance and Capacity of Distributed Dynamic Channel Assignment and Power Control in Shadow Fading", Vehicular Technology Conference, 1993.
14. D. C. Cox and D. O. Reudink, "The Behavior of Dynamic Channel Assignment Mobile Communications Systems as a Function of Number of Radio Channels", *IEEE Trans. Commun.*, Vol COM-20, November 1972, 471–479.
15. N. Bambos, S. Chen, and G. Pottie, "Radio link admission algorithms for wireless networks with power control and active link quality protection," in *Proc. Infocom '95*, Boston, Mass. (1995).
16. G. J. Foschini and Z. Miljanic, "A simple distributed autonomous power control algorithm and its convergence," *IEEE Transactions on Vehicular Technology* 42 (1993).
17. S. Grandhi \f2et al.\f1, "Centralized power control in cellular radio systems," *IEEE Transactions on Vehicular Technology* 42 (1993).
18. J. Zander, "Performance of optimum transmitter power control in cellular radio systems," *IEEE Transactions on Vehicular Technology* 41 (1992).
19. M. Benveniste, "Mixed power control with directed assignment (MPCDA), a method for interference reduction in channelized wireless systems," *Telecommunications Systems*, in press. U.S. Pat. No. 5,787,352.

What is claimed is:

1. A method for self-configuring a wireless system during normal operation, said system including a plurality of cells, each cell including a respective base station and at least one mobile station, comprising the steps of:
   assigning preliminary control channels to base stations in a plurality of cells during an initialization phase;
   conducting normal traffic transmissions between base stations and mobile stations in each cell;
   isolating individual signals from base stations by time-sharing a calibration frequency assigned for use by consecutive cells during a scheduled interval;
   measuring a signal strength of the calibration frequency received at mobile stations within a cell and mobile stations nearby the cell from a base station within the cell during the scheduled interval and determining signal-to-interference ratios between the base station and the mobile stations as a communication quality metric;
   deriving improved channel re-use criteria from said signal-to-interference ratios; and
   selectively reassigning channels to the base station based on said improved re-use criteria.

2. The method of claim 1, which further comprises the step of:
   automatically updating neighbor lists in response to said reassigning channels.

3. A method for self-configuring a wireless system prior to normal operation, said system including a plurality of cells, each cell including a respective base station and at least one mobile station, comprising the steps of:
   isolating individual signals from base stations by time-sharing a calibration frequency assigned for transmission by consecutive cells during a scheduled interval;
   measuring a signal strength of the calibration frequency received at other base stations from a base station within the cell during the scheduled interval and determining signal attenuation between the base stations on which channel re-use criteria are derived; and
   selectively assigning channels to the base stations based on said channel re-use criteria.

4. The method of claim 3, which further comprises the step of:
   automatically updating neighbor lists in response to said reassigning channels.

5. A method for self-configuring a wireless system during normal operation, said system including a plurality of cells, each cell including a respective base station and at least one mobile station, comprising the steps of:
- assigning preliminary control channels to base stations in a plurality of cells during an initialization phase;
- conducting normal traffic transmissions between base stations and mobile stations in each cell;
- isolating individual signals from base stations by time-sharing a calibration frequency assigned for use by consecutive cells during a scheduled interval;
- measuring a signal strength of the calibration frequency received at mobile stations within a cell and mobile stations nearby the cell from a base station within the cell during the scheduled interval and determining signal-to-interference ratios between the base station and the mobile stations as a communication quality metric; and
- deriving an improved neighbor list based on said signal-to-interference ratios.

6. A method for self-configuring a wireless system prior to normal operation, said system including a plurality of cells, each cell including a respective base station and at least one mobile station, comprising the steps of:
- isolating individual signals from base stations by time-sharing a calibration frequency assigned for transmission by consecutive cells during a scheduled interval;
- measuring a signal strength of the calibration frequency received at other base stations from a base station within the cell during the scheduled interval and determining signal attenuation between the base stations; and
- deriving an improved neighbor list based on said signal attenuation.

7. A system for self-configuring a wireless network during normal operation, said wireless network including a plurality of cells, each cell including a respective base station and at least one mobile station, said base stations having preliminary control channels assigned in a plurality of cells during an initialization phase, comprising:
- a plurality of base stations conducting normal traffic transmissions between base stations and mobile stations in each cell;
- said base stations isolating individual signals from base stations by time-sharing a calibration frequency assigned for use by consecutive cells during a scheduled interval;
- a plurality of mobile stations measuring a signal strength of the calibration frequency received at mobile stations within a cell and mobile stations nearby the cell from a base station within the cell during the scheduled interval and determining signal-to-interference ratios between the base station and the mobile stations as a communication quality metric;
- said base stations deriving improved channel re-use criteria from said signal-to-interference ratios and selectively reassigning channels based on said improved re-use criteria.

8. A system for self-configuring a wireless system prior to normal operation, said system including a plurality of cells, each cell including a respective base station and at least one mobile station, comprising the steps of:
- a plurality of base stations isolating individual signals from base stations by time-sharing a calibration frequency assigned for transmission by consecutive cells during a scheduled interval;
- said base stations measuring a signal strength of the calibration frequency received at other base stations from a base station within the cell during the scheduled interval and determining signal attenuation between the base stations on which channel re-use criteria are derived; and
- said base stations selectively assigning channels based on said channel re-use criteria.

* * * * *